US010841794B2

United States Patent
Liu et al.

(10) Patent No.: US 10,841,794 B2
(45) Date of Patent: Nov. 17, 2020

(54) ADAPTIVE MOTION VECTOR RESOLUTION

(71) Applicant: Futurewei Technologies, Inc., Plano, TX (US)

(72) Inventors: Shan Liu, San Jose, CA (US); Jiali Fu, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/018,550

(22) Filed: Jun. 26, 2018

(65) Prior Publication Data

US 2019/0089975 A1    Mar. 21, 2019

Related U.S. Application Data

(60) Provisional application No. 62/560,037, filed on Sep. 18, 2017.

(51) Int. Cl.
*H04W 12/06* (2009.01)
*H04N 19/117* (2014.01)
(Continued)

(52) U.S. Cl.
CPC ........ *H04W 12/06* (2013.01); *G06K 9/00744* (2013.01); *G06K 9/00899* (2013.01);
(Continued)

(58) Field of Classification Search
CPC ..... H04W 12/06; H04N 19/523; H04N 19/70; H04N 19/46; H04N 19/117; H04N 19/91;
(Continued)

(56) References Cited

U.S. PATENT DOCUMENTS 5,978,048 A    11/1999   Lee
8,411,750 B2 *  4/2013   Dane ................... H04N 19/513
                                           375/240.01
(Continued)

FOREIGN PATENT DOCUMENTS

CN    101986242 A    3/2011
CN    103533330 A    1/2014
CN    103796011 A    5/2014

OTHER PUBLICATIONS

Machine Translation and Abstract of Chinese Publication No. CN101986242, Mar. 16, 2011, 13 pages.
(Continued)

*Primary Examiner* — Dramos Kalapodas
(74) *Attorney, Agent, or Firm* — Conley Rose, P.C.

(57) ABSTRACT

A mechanism of video coding is provided. The mechanism includes determining a motion vector predictor (MVP), a horizontal motion vector difference component (MVDx), and a vertical motion vector difference component (MVDy) associated with a motion vector (MV). A horizontal MV resolution (MVR) and a vertical MVR are also determined for the MV. A horizontal component of the MVP is rounded to a precision specified by the horizontal MVR and a vertical component of the MVP is rounded to a precision specified by the vertical MVR. The MV is determined based on the MVP, the MVDx, and the MVDy. The MV is then employed to position a current block in a current frame relative to a reference block in a reference frame. A video stream including the current frame is generated for display on a screen.

12 Claims, 8 Drawing Sheets

(51) Int. Cl.

| | | |
|---|---|---|
| G06K 9/00 | (2006.01) | |
| H04N 19/523 | (2014.01) | |
| H04N 19/46 | (2014.01) | |
| G06K 9/46 | (2006.01) | |
| H04N 19/70 | (2014.01) | |
| H04N 19/184 | (2014.01) | |
| H04N 19/52 | (2014.01) | |
| H04N 19/573 | (2014.01) | |
| H04N 19/91 | (2014.01) | |
| G06K 9/20 | (2006.01) | |
| H04L 29/06 | (2006.01) | |

(52) U.S. Cl.
CPC ....... *G06K 9/00912* (2013.01); *G06K 9/2036* (2013.01); *G06K 9/4642* (2013.01); *H04L 63/0861* (2013.01); *H04N 19/117* (2014.11); *H04N 19/184* (2014.11); *H04N 19/46* (2014.11); *H04N 19/52* (2014.11); *H04N 19/523* (2014.11); *H04N 19/573* (2014.11); *H04N 19/70* (2014.11); *H04N 19/91* (2014.11); *G06K 9/00013* (2013.01); *G06K 9/00208* (2013.01); *G06K 9/00255* (2013.01)

(58) Field of Classification Search
CPC .... H04N 19/573; H04N 19/52; H04N 19/184; H04N 19/00684; G06K 9/4642; G06K 9/00744; G06K 9/00899; G06K 9/00912; G06K 9/2036; G06K 9/00208; G06K 9/00255; G06K 9/00013; H04L 63/0861
See application file for complete search history.

(56) References Cited

U.S. PATENT DOCUMENTS

| | | | |
|---|---|---|---|
| 8,526,495 | B2 | 9/2013 | Liu et al. |
| 9,049,452 | B2 | 6/2015 | Liu et al. |
| 9,363,511 | B2 | 6/2016 | Zhang et al. |
| 9,510,012 | B2 | 11/2016 | Liu et al. |
| 9,749,642 | B2 * | 8/2017 | Sullivan ............... H04N 19/136 |
| 9,769,472 | B2 | 9/2017 | Liu et al. |
| 9,774,881 | B2 * | 9/2017 | Zhou ...................... H04N 19/70 |
| 9,788,019 | B2 | 10/2017 | Liu et al. |
| 9,813,726 | B2 | 11/2017 | Liu et al. |
| 2013/0229485 | A1 * | 9/2013 | Rusanovskyy ........ H04N 19/52 348/43 |
| 2014/0086323 | A1 | 3/2014 | Chuang et al. |
| 2014/0086329 | A1 * | 3/2014 | Seregin ................. H04N 19/33 375/240.16 |
| 2014/0192885 | A1 * | 7/2014 | Seregin ................. H04N 19/52 375/240.16 |
| 2014/0254669 | A1 * | 9/2014 | Rapaka ................. H04N 19/80 375/240.12 |
| 2015/0139325 | A1 * | 5/2015 | Chuang ................. H04N 19/31 375/240.16 |
| 2015/0172719 | A1 | 6/2015 | Guo et al. |
| 2015/0195562 | A1 * | 7/2015 | Li .......................... H04N 19/56 375/240.02 |
| 2015/0365692 | A1 | 12/2015 | Liu et al. |
| 2016/0142706 | A1 | 5/2016 | Chuang et al. |
| 2016/0337661 | A1 * | 11/2016 | Pang ..................... H04N 19/523 |
| 2017/0272745 | A1 | 9/2017 | Liu et al. |
| 2017/0332095 | A1 * | 11/2017 | Zou ...................... H04N 19/124 |
| 2017/0353730 | A1 | 12/2017 | Liu et al. |
| 2017/0374369 | A1 | 12/2017 | Chuang et al. |
| 2018/0091816 | A1 * | 3/2018 | Chien .................... H04N 19/70 |
| 2018/0098089 | A1 * | 4/2018 | Chen ..................... H04N 19/521 |
| 2018/0278940 | A1 * | 9/2018 | Park ...................... H04N 19/172 |
| 2018/0359468 | A1 * | 12/2018 | Seo ....................... H04N 19/105 |
| 2019/0208223 | A1 * | 7/2019 | Galpin .................. H04N 19/139 |

OTHER PUBLICATIONS

Machine Translation and Abstract of Chinese Publication No. CN103533330, Jan. 22, 2014, 12 pages.
Machine Translation and Abstract of Chinese Publication No. CN103796011, May 14, 2014, 10 pages.
Foreign Communication From a Counterpart Application, PCT Application No. PCT/CN2018/106130, English Translation of International Search Report dated Dec. 20, 2018, 5 pages.
Foreign Communication From a Counterpart Application, PCT Application No. PCT/CN2018/106130, English Translation of Written Opinion dated Dec. 20, 2018, 4 pages.
"Series H: Audiovisual and Multimedia Systems, Infrastructure of audiovisual services—Coding of moving video, High efficiency video coding," ITU-T, H.265, Dec. 2016, 664 pages.
Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.
Liu, S., et al., Complexity Reduction of Joint Temporal-Spatial Bit Allocation Using R-D Models for Video Streaming, IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H.264/AVC," IEEE International Symposium on Circuits and Systems, 2008, pp. 636-639.
Lou J. et al , "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AFIG16 Unification of SDIP and NSQT," JCTVC-H0347, Feb. 1-10, 2012, 9 pages.

(56) References Cited

OTHER PUBLICATIONS

Zhang, X., et al., "Non-CE6: Intra mode coding with fixed length binarization," JCTVC-H0435, WG11 No. m23311, Feb. 1-10, 2012, 5 pages.

Kim, J., et al., "nonTE5: Assigning intra prediction mode to inter layer intra predicted blocks in enhance layer," JCTVC-L0239, Jan. 14-23, 2013, 5 pages.

Lai, P., et al., "SCE3.4 Generalized Combined Prediction," JCTVC-M0221, Apr. 18-26, 2013, 9 pages.

Lai, P., et al., "Non-SCE3.4: Simplified Generalized Combined Prediction," JCTVC-M0222, Apr. 2013, 10 pages.

Lai, P., et al., "Non-SCE3.4: Simplified Generalized Combined Prediction," JCTVC-M0222_r1, Apr. 18-26, 2013, 9 pages.

Seregin, V., et al., "Uni-prediction for combined inter mode," JCTVC-M0445, Apr. 18-26, 2013, 11 pages.

Xu, X., et al., "On unification of intra block copy and inter-picture motion compensation," JCTVC-Q0132, Jan. 9-17, 2014, 14 pages.

Xu, X., et al., "Non-CE2: Intra BC merge mode with default candidates," JCTVC-50123, Oct. 17-24, 2014, 7 pages.

Xu, X., et al., "CE2 Test 12: Intra BC merge mode with default candidates," JCTVC-T0073, Feb. 10-18, 2015, 6 pages.

\* cited by examiner

ADAPTIVE MOTION VECTOR RESOLUTION

CROSS-REFERENCE TO RELATED APPLICATIONS

This patent application claims the benefit of U.S. Provisional Patent Application No. 62/560,037, filed Sep. 18, 2017, by Shan Liu, et al., and titled "Adaptive Motion Vector Resolution," which is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method, implemented in a computing device. The method comprises determining, by a processor in the computing device, a motion vector predictor (MVP), a horizontal motion vector difference component (MVDx), and a vertical motion vector difference component (MVDy) associated with a motion vector (MV); determining, by the processor, a horizontal MV resolution (MVR) and a vertical MVR for the MV; rounding, by the processor, a horizontal component of the MVP to a precision specified by the horizontal MVR and rounding a vertical component of the MVP to a precision specified by the vertical MVR; determining the MV based on the MVP, the MVDx, and the MVDy; employing, by the processor, the MV to position a current block in a current frame relative to a reference block in a reference frame; and generating, by the processor, a video stream including the current frame for display on a screen.

Optionally, in any of the preceding aspects, another implementation of the aspect includes, receiving a bitstream comprising horizontal MVR flags indicating the horizontal MVR and vertical MVR flags indicating the vertical MVR.

Optionally, in any of the preceding aspects, another implementation of the aspect includes, wherein the horizontal MVR flags include a horizontal integer MVR flag indicating whether the horizontal MVR is a quarter luma sample precision, and a horizontal four MVR flag indicating whether the horizontal MVR is an integer luma sample precision or a four luma sample precision, and wherein the vertical MVR flags include a vertical integer MVR flag indicating whether the vertical MVR is a quarter luma sample precision, and a vertical four MVR flag indicating whether the vertical MVR is an integer luma sample precision or a four luma sample precision.

Optionally, in any of the preceding aspects, another implementation of the aspect includes, wherein the horizontal MVR flags and the vertical MVR flags are signaled in the bitstream in a sequence parameter set (SPS), in a picture parameter set (PPS), in a slice header, in a coding unit (CU), or in a prediction unit (PU).

Optionally, in any of the preceding aspects, another implementation of the aspect includes, wherein the horizontal MVR flags and the vertical MVR flags are signaled in the bitstream in slice header flags that depend from sequence parameter set (SPS) flags or picture parameter set (PPS) flags.

Optionally, in any of the preceding aspects, another implementation of the aspect includes, wherein the horizontal MVR flags and the vertical MVR flags are signaled in the bitstream in coding unit (CU) flags that depend from slice header flags.

Optionally, in any of the preceding aspects, another implementation of the aspect includes, receiving a bitstream comprising flags indicating the horizontal MVR and a horizontal to vertical MVR ratio indicating a ratio between the horizontal MVR and the vertical MVR.

Optionally, in any of the preceding aspects, another implementation of the aspect includes, receiving a bitstream comprising flags indicating the vertical MVR and a horizontal to vertical MVR ratio indicating a ratio between the horizontal MVR and the vertical MVR.

Optionally, in any of the preceding aspects, another implementation of the aspect includes, receiving a bitstream comprising flags indicating the horizontal MVR, wherein determining the vertical MVR includes deriving the vertical MVR based on the horizontal MVR and a ratio of a picture width in luma samples and a picture height in luma samples.

Optionally, in any of the preceding aspects, another implementation of the aspect includes, receiving a bitstream comprising flags indicating the vertical MVR, wherein determining the horizontal MVR includes deriving the horizontal MVR based on the vertical MVR and a ratio of a picture width in luma samples and a picture height in luma samples.

Optionally, in any of the preceding aspects, another implementation of the aspect includes, receiving a bitstream comprising flags indicating the horizontal MVR, wherein determining the vertical MVR includes deriving the vertical MVR based on the horizontal MVR and a ratio of a motion search range width and a motion search range height.

Optionally, in any of the preceding aspects, another implementation of the aspect includes, receiving a bitstream comprising flags indicating the vertical MVR, wherein determining the horizontal MVR includes deriving the horizontal MVR based on the vertical MVR and a ratio of a motion search range width and a motion search range height.

In an embodiment, the disclosure includes a method, implemented in a computing device. The method comprises determining, by a processor in the computing device, a motion vector (MV) to predict a position of a current block in a current frame relative to a reference block in a reference frame; selecting, by the processor, a motion vector predictor (MVP) to predict the MV; determining, by the processor, a horizontal motion vector difference component (MVDx) and a vertical motion vector difference component (MVDy) that indicate a difference between the MVP and the MV; determining, by the processor, a horizontal MV resolution (MVR) and a vertical MVR for the MV; encoding an index of the MVP, the MVDx, the MVDy, and an indication of the horizontal MVR and the vertical MVR in a bitstream to support determination of the MV at a decoder; and transmitting, via a transmitter in the computing device, the bitstream toward the decoder.

Optionally, in any of the preceding aspects, another implementation of the aspect includes, wherein the indication of the horizontal MVR and the vertical MVR includes horizontal MVR flags indicating the horizontal MVR and vertical MVR flags indicating the vertical MVR.

Optionally, in any of the preceding aspects, another implementation of the aspect includes, wherein the indication of the horizontal MVR and the vertical MVR includes a directional set of MVR flags and a ratio of horizontal resolution and vertical resolution.

Optionally, in any of the preceding aspects, another implementation of the aspect includes, wherein the indication of the horizontal MVR and the vertical MVR includes a directional set of MVR flags, and wherein the horizontal MVR and the vertical MVR are determined at the decoder based on the directional set of MVR flags and a ratio of picture width and picture height or based on the directional set of MVR flags and a ratio of search range height and search range width.

In an embodiment, the disclosure includes a computing device comprising: a receiver to receive a bitstream; and a processor coupled to the receiver. The processor is configured to: determine a motion vector predictor (MVP), a horizontal motion vector difference component (MVDx), and a vertical motion vector difference component (MVDy) based on data coded in the bitstream; determine a motion vector (MV) based on the MVP, the MVDx, and the MVDy; determine a horizontal MV resolution (MVR) and a vertical MVR for the MV; round a horizontal component of the MV to a precision specified by the horizontal MVR and round a vertical component of the MV to a precision specified by the vertical MVR; position a current block in a current frame relative to a reference block in a reference frame based on the MV; and generate a video stream including the current frame for display on a screen.

Optionally, in any of the preceding aspects, another implementation of the aspect includes, wherein the bitstream includes horizontal MVR flags indicating the horizontal MVR and vertical MVR flags indicating the vertical MVR.

Optionally, in any of the preceding aspects, another implementation of the aspect includes, wherein the processor determines the horizontal MVR and the vertical MVR based on a directional set of MVR flags in the bitstream and a ratio of horizontal resolution and vertical resolution in the bitstream.

Optionally, in any of the preceding aspects, another implementation of the aspect includes, wherein the processor determines the horizontal MVR and the vertical MVR based on a directional set of MVR flags in the bitstream and a ratio of picture width and picture height or based on based on the directional set of MVR flags and a ratio of search range height and search range width.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
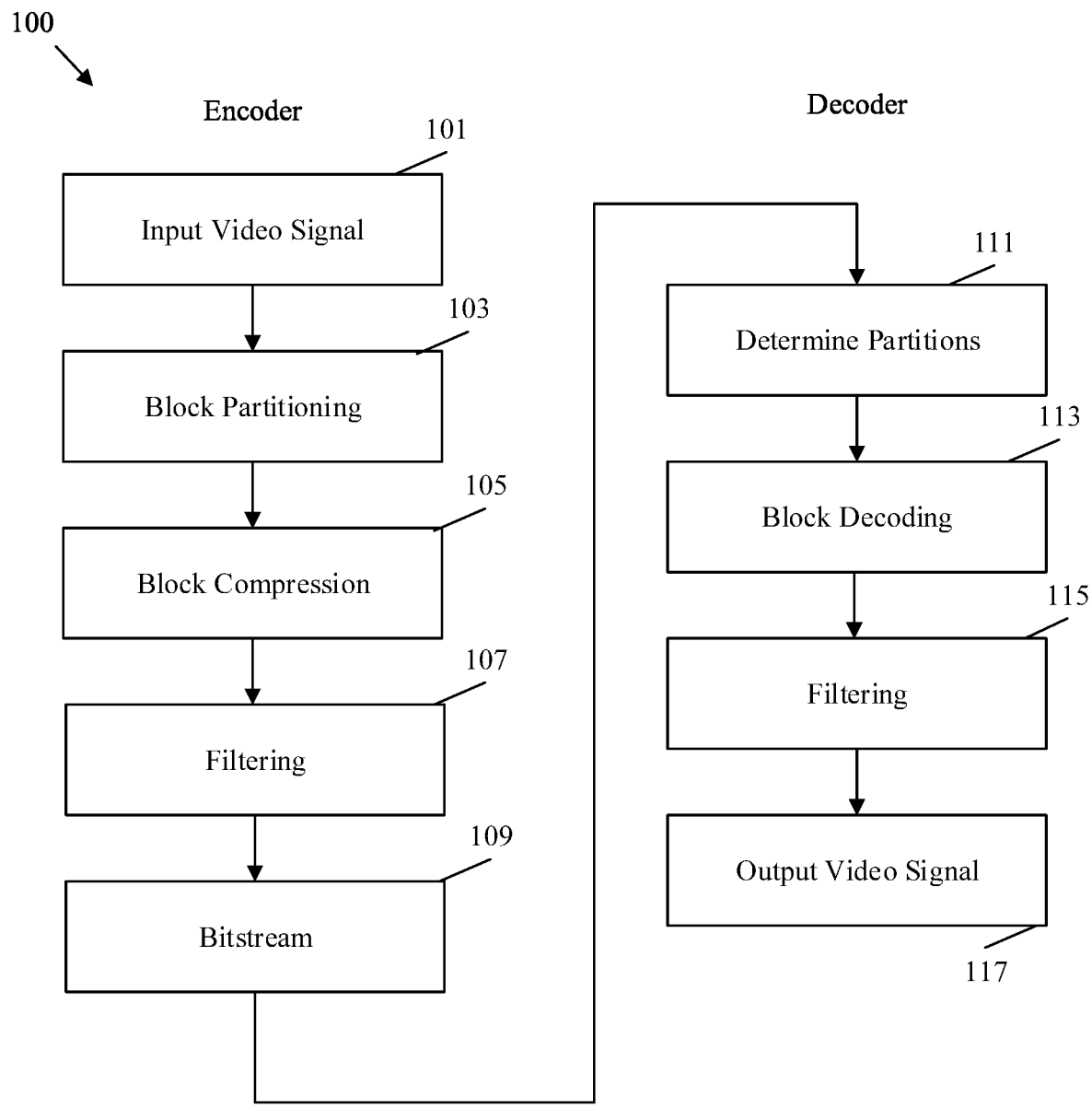
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding schemes subdivide video signals into image frames, and then subdivide the image frames into various types of blocks. The image blocks are then compressed by intra-prediction or inter-prediction. Intra-prediction is a mechanism of coding blocks by reference to other blocks in the same frame, and inter-prediction is a mechanism of coding blocks by reference to other blocks in different frames. In inter-prediction, a motion vector (MV) indicates a horizontal and vertical displacement between a position of a reference block in a reference frame and a position of a matching current block in a current frame. In order to further compress data, the MV may not be directly signaled in a bitstream between an encoder and a decoder. Instead, a candidate list of motion vector predictors (MVPs) can be generated at the encoder. The candidate list may contain MVs used in spatially adjacent blocks in the same frame and/or temporally adjacent blocks in adjacent frames. The encoder can then encode an index indicating a selected MVP from the candidate list into the bitstream. A similar candidate list can later be created at the decoder to interpret the signaled index. The selected MVP may be different from the MV for the current block. Accordingly, the encoder may also encode a horizontal motion vector difference (MVDx) and a vertical motion vector difference (MVDy) that indicate the horizontal and vertical differences, respectively, between the MVP and the MV. The decoder can employ the MVP, the MVDx, and the MVDy to determine the MV for the current block. The decoder can then position the current block in the current frame based on the determined MV.

Motion between frames may not occur at integer values of pixels in some cases. Accordingly, MVs can be coded at various resolutions. Higher resolutions provide increased prediction accuracy, but also reduce compression. An AMVR scheme can be employed to select a resolution for each MV. The resolutions are selected to balance both prediction accuracy and compression. In an example, AMVR can employ a quarter luma sample resolution, a one luma sample resolution, or a four luma sample resolution. The selected resolution can then be signaled in the bitstream as a MVR. At the decoder, the MV can be rounded to a level of precision specified by the MVR. Such a scheme is effective when the screen employed to display a video sequence including the predicted blocks/frames is substantially square. However, many displays are rectangular in shape. As such, the optimal resolution of the horizontal component of the MV may be different than the optimal resolution of the vertical component of the MV. This may result in beneficial prediction accuracy for one component at the expense of sub-optimal compression for another component.

Disclosed herein are various mechanisms to separately signal horizontal MVRs and vertical MVRs for the MVs. In this manner, an optimized MVR can be selected for both the horizontal component of the MV and the vertical component of the MV. In one example, the horizontal MVR and the vertical MVR can both be signaled in the bitstream by employing corresponding flags. A first vertical flag may indicate whether the resolution for the vertical MVR is quarter luma sample precision or integer luma sample precision. When the resolution is an integer value, a second vertical flag may indicate whether the vertical MVR is one luma sample precision or four luma sample precision. A similar first horizontal flag and a second horizontal flag can be employed to indicate the horizontal MVR in a similar manner. In an example, such flags can be signaled in the video sequence parameter set (SPS), picture parameter set (PPS), a slice header, a coding unit (CU) header, and/or in a prediction unit (PU) header. As a particular example, horizontal and vertical flags can be included in a slice header and be dependent on flags in the SPS or PPS. Further, the horizontal and vertical flags can be included in a CU and be dependent on flags in the slice header. In another example, a directional set of MVR flags can be signaled for the horizontal MVR or the vertical MVR, but not both. The signaled MVR flags can then be employed to derive the un-signaled MVR flags (e.g., vertical or horizontal MVR flags, respectively). In a particular example, a ratio between the horizontal MVR and the vertical MVR can also be signaled. The horizontal to vertical MVR ratio and the directional set of MVR flags can be employed to derive the un-signaled MVR flags. The directional set of flags and the horizontal to vertical MVR ratio can be signaled in the SPS, PPS, slice header, and/or CU header. In another example, the signaled MVR flags can be employed to derive the un-signaled MVR by employing a picture width and picture height ratio. The picture width and picture height ratio may be specific to the display screen, and hence may not be separately signaled in the bitstream. In another example, the signaled MVR flags can be employed to derive the un-signaled MVR by employing a motion search width and motion search height ratio. The motion search width and motion search height ranges may be employed when searching as part of a separate block matching process. Hence, such data may already be signaled or predefined for other purposes and used for flag derivation.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be divided from coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process (as is the creation of a video stream from a coded bitstream). Accordingly, steps 101, 103, 105, 107, and 109 may occur continuously and/or simultaneously over many frames and blocks. Further, steps 111, 113, 115, and 117 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.). The encoder then encodes the code word for the selected option. This scheme reduces the size of the code words as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artefacts. Once the frames are filtered, the video signal can be output to a display at step 117 for viewing by an end user.

Method 100 may be modified to employ separate horizontal MVRs and vertical MVRs. Specifically, step 105 may employ inter-prediction by encoding MVs to indicate a position of a current block in a current frame based on a position of a matching reference block in a reference frame. An MV may be encoded to a resolution. A resolution of an MV (e.g., an MVR) is a level of precision of the data encoded to indicate the MV. A higher MVR results in a more accurate MV at the cost of increased encoding size, while a lower MVR results in a less accurate MV with a reduced encoding size. Accordingly, MVR can be selected on a case by case basis to balance encoding size and reconstructed image quality. For example, an MV can have a resolution with a precision of quarter luma sample, one luma sample, or four luma sample. An MV includes both a horizontal component and a vertical component. In some systems, the MVR for an MV is the same for both the horizontal and vertical components. In the present method 100, step 105 is modified to allow for different MVRs for the horizontal component and the vertical component of a single MV. This may allow for increased coding efficiency in some cases. For example, a reduced horizontal precision may cause less of a loss in picture quality than a reduced vertical precision, or vice versa, in some cases. This may be particularly true for screens that are rectangular instead of square. Once the horizontal and vertical MVRs are selected, such MVRs can be signaled in the bitstream at step 109. The decoder can then determine the horizontal and vertical MVRs during block decoding at step 113. Hence, the horizontal and vertical MVRs can be used by the decoder when positioning a current block in order to reconstruct a frame via inter-prediction. The resulting frame generated based on the horizontal and vertical MVRs can then be sent to a display as part of a video signal at step 117.

Figure 2:
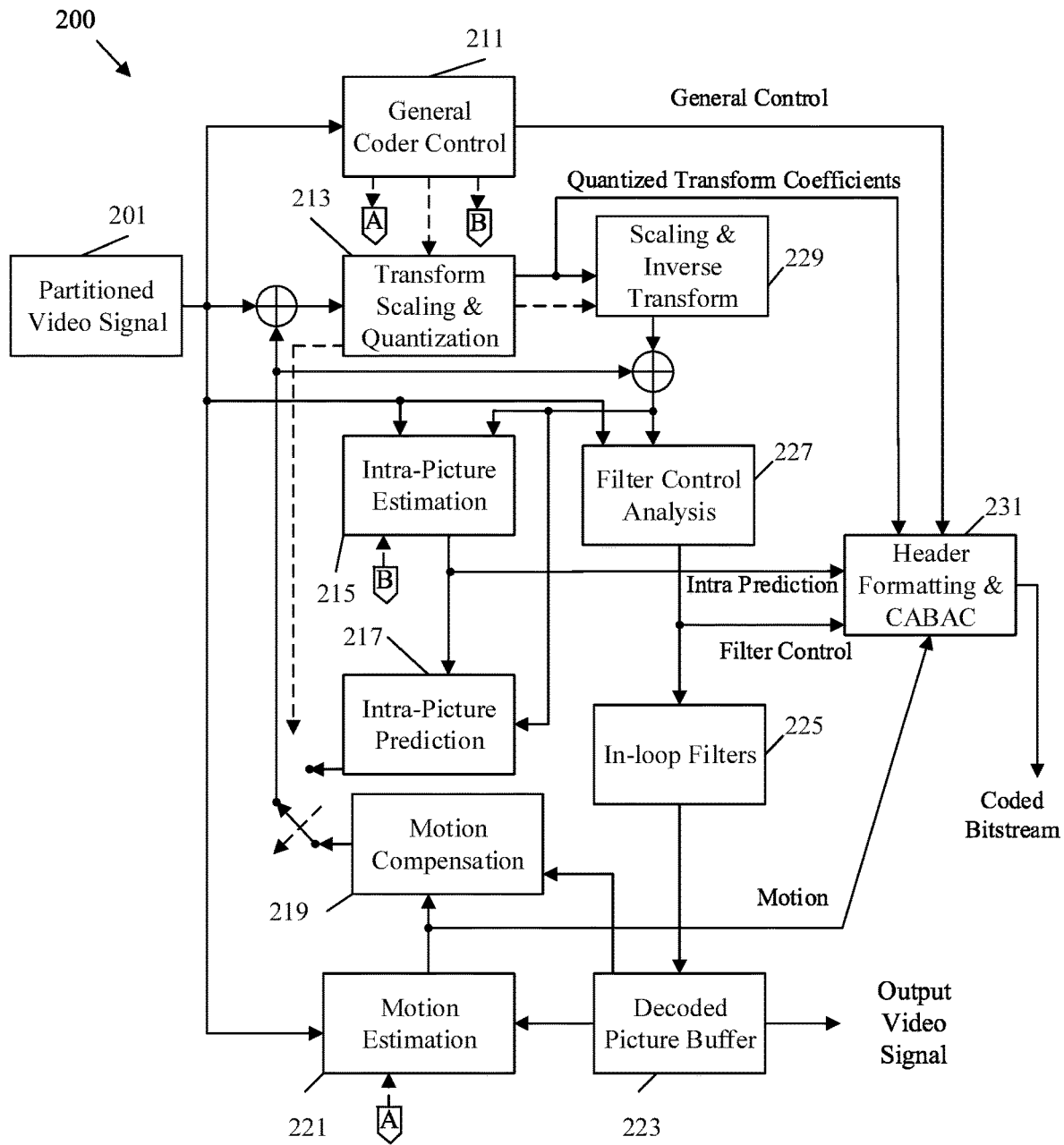
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filter component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO). It should be noted that the motion estimation component 221 may also employ RDO when selecting and/or encoding MVs for inter-prediction in a manner similar to selection of intra-prediction modes for intra-prediction by the intra-picture estimation component 215.

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction mode, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

As discussed with respect to FIG. 1. above, the present disclosure includes separate horizontal and vertical MVRs. Accordingly, the motion estimation component 221 and/or motion compensation component 219 may be modified to determine separate MVRs. For example, the motion estimation component 221 and/or motion compensation component 219 may employ rate distortion optimization to compare reconstructed video quality and encoding size for each horizontal MVR resolution. The motion estimation component 221 and/or motion compensation component 219 may also employ rate distortion optimization to compare reconstructed video quality and encoding size for each vertical MVR resolution. The motion estimation component 221 and/or motion compensation component 219 may also select a separate horizontal MVR and vertical MVR to separately balance video quality and coding size due to resolution of the horizontal component of the MV and the vertical component of the MV. As a specific example, the motion estimation component 221 may select a horizontal MVR candidate for a MV. The motion compensation component 219 may then generate a reconstructed frame based on the selected horizontal MVR candidate and compare the reconstructed frame to the original frame. This process can be repeated for each horizontal MVR candidate and vertical MVR candidate. The motion compensation component 219 may then select a horizontal MVR and a vertical MVR from the horizontal MVR candidates and vertical MVR candidates, respectively. For example, the horizontal MVR can be selected by comparing a weighted metric representing video quality loss due to changes in horizontal MVR with a weighted metric representing difference in encoding size. Likewise, the vertical MVR can be selected by comparing a weighted metric representing video quality loss due to changes in vertical MVR with a weighted metric representing difference in encoding size. The selected horizontal and vertical MVRs can then be sent to the header formatting and CABAC component 231 as motion data for encoding and transmission to a decoder. The decoder may then employ the horizontal and vertical MVRs along with the MV to decode the corresponding block and reconstruct the relevant frame for display.

Figure 3:
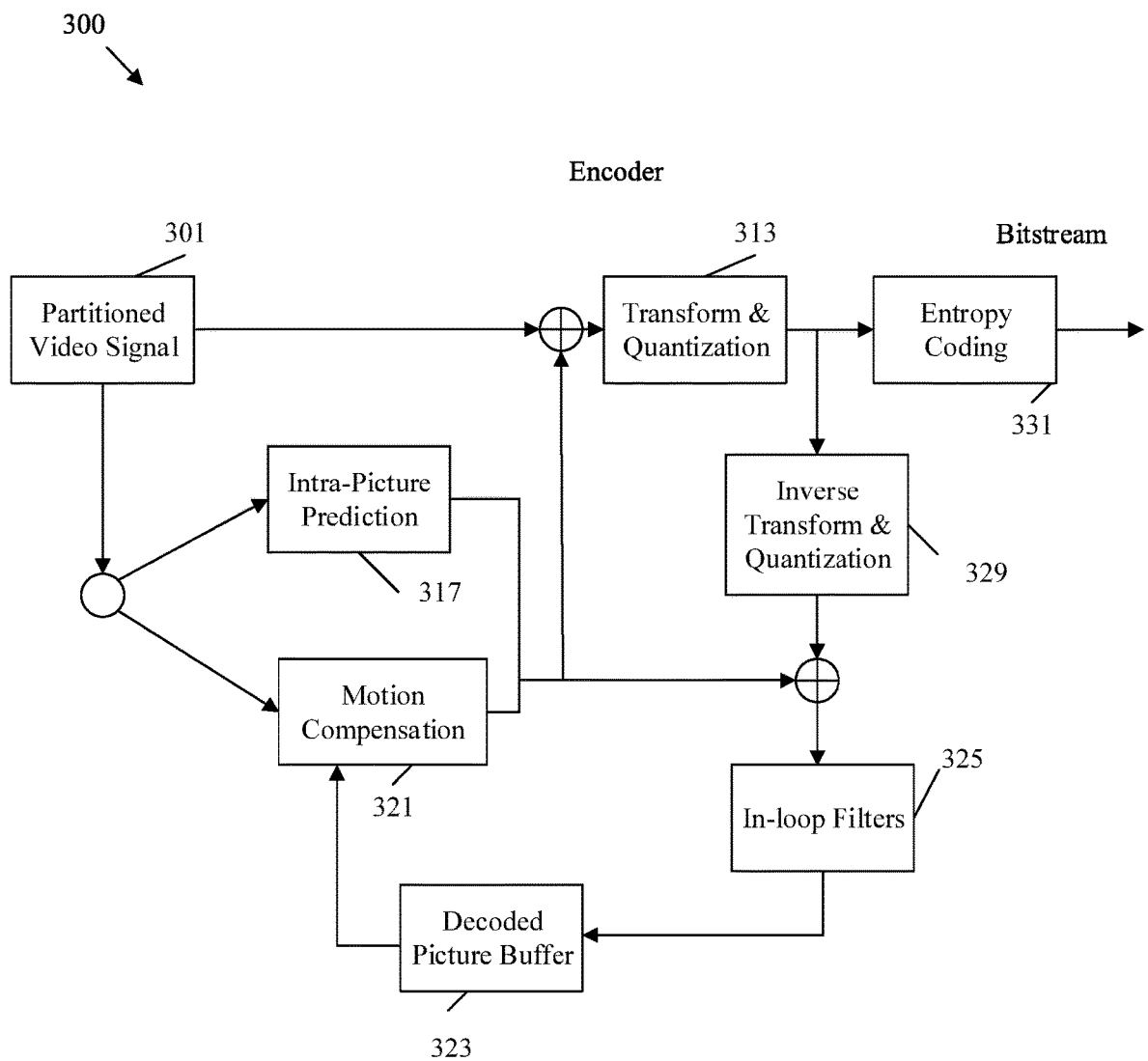
FIG. 3 is a block diagram illustrating an example video encoder that may implement adaptive motion vector resolution (AMVR).

FIG. 3 is a block diagram illustrating an example video encoder 300 that may implement AMVR. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use as reference blocks by the motion compensation component 321. The decoded picture buffer 323 may be substantially similar to the decoded picture buffer 223.

The following is a more detailed explanation of horizontal and vertical MVRs as discussed with respect to FIGS. 1-2 and as applied in encoder 300. The motion compensation component 321 encodes the position of blocks by encoding MVs. An MV indicates a horizontal and vertical displacement between a position of a reference block in a reference frame and a position of a current block in the current frame. Accordingly, a reference block and a series of MVs can represent multiple blocks in multiple frames. The MVs are encoded by the motion compensation component 321 according to adaptive motion vector prediction (AMVP). AMVP is a mechanism of compressing MV signaling. In AMVP, a candidate list of MVPs is generated. MVPs are MVs employed by blocks that are spatially and/or temporally positioned adjacent to a current block. For example, the motion compensation component 321 can determine MVs employed by blocks that are adjacent to the current block in the current frame as well as MVs employed by blocks that are in a similar position in adjacent frames. Such MVs can be employed to predict the MV for the current block, and are hence MVPs. The motion compensation component 321 adds the MVPs to a candidate list. The motion compensation component 321 then employs a rate distortion optimization (RDO) process, which is a process that compares the loss of video quality for each MVP with an amount of data employed to encode the corresponding MVP. The MVP from the candidate list with the best tradeoff, according to the RDO process, is selected as the MVP. The motion compensation component 321 encodes the selected MVP into the bitstream as an index of the candidate list. The selected MVP may be different from the MV. Hence, the horizontal and vertical differences between the MVP and the MV are also signaled in the bitstream by the motion compensation component 321. The horizontal and vertical differences between the MVP and the MV are considered by the RDO. Hence the MVP with the smallest differences with the MV has a high selection probability.

The motion compensation component 321 can also employ the RDO process to implement AMVR. AMVR is a mechanism to compress MVs by employing a variable resolution. Specifically, the RDO process considers the video quality loss for each MVR versus the amount of data employed to signal the MV at the corresponding resolution. For example, more data may be employed to indicate a difference between the MVP and a high resolution MV than to indicate a difference between the MVP and a low resolution MV. In some cases the loss of video quality is not significant and a lower resolution for the MV is sufficient. In other cases, the difference in video quality is significant and a higher resolution is selected despite the increased data signaling overhead. In AMVR, the RDO process considers each option and makes a resolution selection for each MV. In AMVR, a MVR can be selected as quarter luma sample precision, single luma sample precision, or four luma sample precision.

Providing a single MVR for a MV is sufficient for square screens. However, many modern screens are rectangular. Accordingly, the motion compensation component 321 can employ the RDO process to select a separate horizontal MVR and vertical MVR for each MV. In this way, the video quality loss and data usage can be considered independently for the horizontal axis and the vertical axis. The sections below include multiple signaling mechanisms that allow the motion compensation component 321 to select and encode both a vertical MVR and a horizontal MVR in a manner that supports greater compression of the MV signaling while adding varying amounts of signaling overhead to the AMVP/AMVR process.

Figure 4:
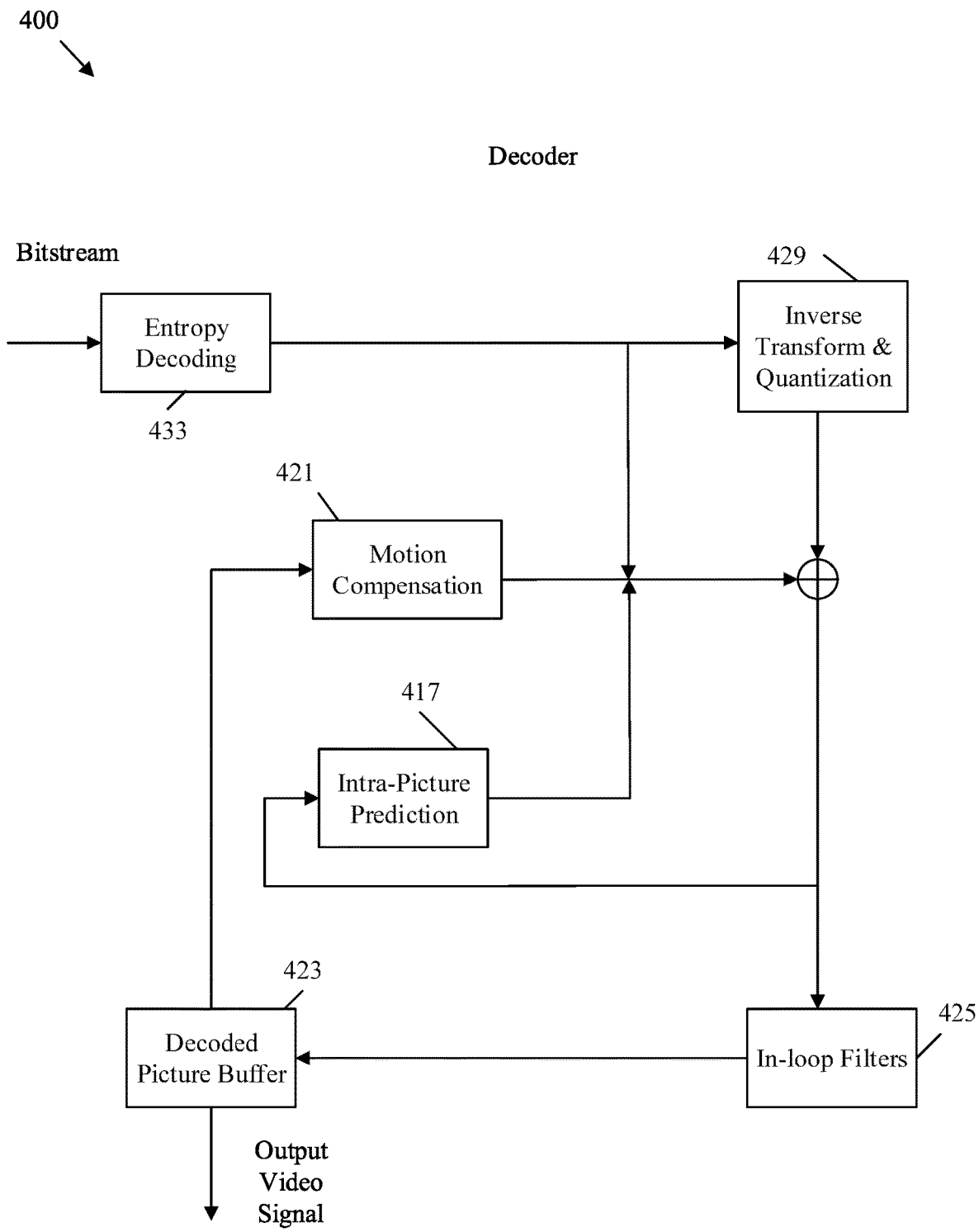
FIG. 4 is a block diagram illustrating an example video decoder that may implement AMVR.

FIG. 4 is a block diagram illustrating an example video decoder 400 that may implement a noise suppression filter. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operates in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filters the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The motion compensation component 421 may not perform an RDO process. However, the motion compensation component 421 generates a candidate list of MVPs in a similar manner to motion compensation component 321. Specifically, motion compensation component 421 generates the candidate list with MVs that are employed by blocks that are spatially and temporally adjacent to the current block. Such MVs are obtained from the decoded picture buffer 423. A redundancy check may be employed to remove redundant MVPs from the candidate list. A zero motion checking process may also be employed to account for the possibility of zero motion in the candidate set. The candidate set at the motion compensation component 421 is generated to match the candidate set generated by the motion compensation component 321. As such, the candidate list index from the bitstream can then be employed to determine the MVP selected by the encoder. The motion compensation component 421 can then employ the vertical difference between the MVP and the MV as well as the horizontal difference between the MVP and the MV, as coded in the bitstream, to determine the original MV. The MV can then be employed to determine the position of the current block.

When determining the MV from the MVP, the decoder 400 may also employ the horizontal MVR and vertical MVR. The decoder 400 may determine the horizontal MVR and vertical MVR directly from the bitstream in some examples. In other examples, the decoder 400 may determine a directional MVR for either the horizontal component or vertical component from the bitstream. The decoder may then derive the other directional MVR from the signaled directional MVR and other parameters determined and/or known to the decoder 400. Once the horizontal MVR and vertical MVR are determined, the decoder 400 can round the horizontal and vertical components of the MVP to the corresponding resolutions. The MV can then be determined based on the MVP that is rounded based on the horizontal and vertical MVRs. The determined MV can then be employed to position the corresponding block in a current frame based on a reference block in a reference frame. The current frame can then be positioned into a video signal to be displayed.

The following diagrams are included to illustrate the horizontal and vertical components of the MV/MVP to illustrate the horizontal and vertical MVRs. Also included below are various signaling mechanisms that an encoder 300 can employ to code the horizontal and vertical MVR for determination and/or derivation by a decoder 400.

Figure 5:
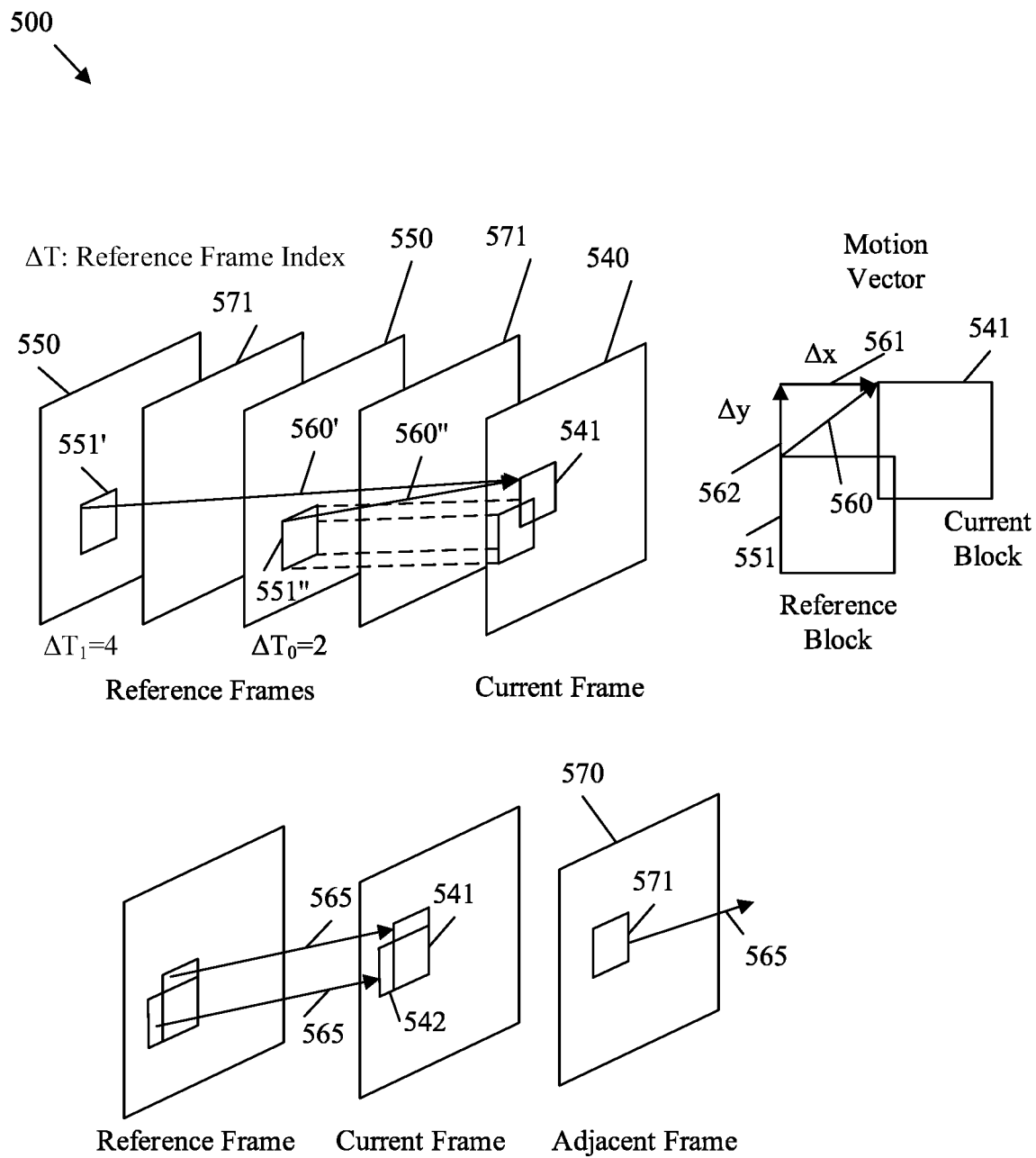
FIG. 5 is a block diagram illustrating an example of motion prediction with motion vectors (MVs).

FIG. 5 is a block diagram illustrating an example of motion prediction 500 with MVs 560. The motion prediction 500 can be employed at an encoder, such as encoder 300, and/or a decoder, such as decoder 400, when performing inter-prediction. Accordingly, motion prediction 500 illustrates a process employed in step 105 and step 113 of method 100, in motion estimation component 221 and motion compensation component 219 of codec system 200, in motion compensation component 321 of encoder 300, and/or motion compensation component 421 of decoder 400.

A video stream to be encoded/decoded includes various reference frames 550. A reference frame 550 is a frame in a video stream that is encoded via intra-prediction and used as a reference for encoding/decoding a non-reference frame. A current frame 540 is a frame that is encoded/decoded at a corresponding portion of the coding process. As used herein (e.g., in the inter-prediction context), a current frame 540 is a frame that is encoded or decoded based on a reference frame 550. The current frame 540 can be separated from the corresponding reference frame 550 by one or more non-reference frames 571. A non-reference frames 571 are other frames that have been previous encoded/decoded based, for example based on the reference frames 550. However, the non-reference frames 571 do not serve as reference frames 550 for other frames. At the encoder, the reference frames 550 are encoded and then reconstructed and stored in a buffer for use in encoding the current frame 540. At the decoder, the reference frames 550 are decoded first for use in decoding the current frame 540. The reference frames 550 can be indexed based on temporal distance from the current frame 540, for example two frames before the current frame 540, four frames before the current frame 540, etc.

The reference frames 550 include a reference block 551. A reference block 551 is a group of related pixel values that appear in a predictable manner over multiple frames. For example, a reference block 551 may visually represent a real world or computer generated object appearing over multiple frames in a video sequence. Rather than coding the reference block 551 in each frame, the reference block 551 can be coded as an MV 560 that indicates the movement of the object between the reference frame 550 and a current frame 540. Depending on the reference block 551 used (e.g., depicted as reference block 551' or reference block 551"), one of several MVs 560 may be employed. Such MVs 560 are depicted as MV560' and MV560", for example. A current block 541, as used herein, is a group of pixel values encoded by reference to a reference block 551. At the encoder, a matching process is employed to match the current block 541 to one or more of the reference blocks 551. An MV 560 is then determined that points to a position of the current block 541 based on a position of the corresponding reference block 551. As multiple reference blocks 551 can be matched to the current block 541, an RDO process is employed to compare the image quality to the encoding size for each MV 560 in order to select an MV 560. For example, the RDO process can consider how closely the reference block 551 matches the current block 541 and hence how much residual data is encoded to represent differences. The RDO process may also consider the resolutions of the MVs 560 when making a decision. At the decoder, the reference frame 550 can be decoded. The reference block 551 and the MV 560 can then be employed to indicate the position of the current block 541 in the current frame 540.

The MV 560 includes a horizontal component 561 that indicates a horizontal change in the position of the current block 541 from the position of the reference block 551. The MV 560 also includes a vertical component 562 that indicates a vertical change in the position of the current block 541 from the position of the reference block 551. The horizontal component 561 and the vertical component 562 can be referred to as spatial components of the MV 560 and can be measured in terms of pixels or sub-portions of pixels. The distance between the current frame 540 and the corresponding reference frame 550 can be referred to as a temporal component of the MV 560 and can be measured according to frame index of the corresponding reference frame 550.

In order to reduce the encoding size of the MV 560, the MV 560 can be encoded according to MVPs 565 by employing an AMVP process. Specifically, the current block 541 may be positioned spatially adjacent to other neighboring blocks 542 in the current frame 540 that are also predicted according to MVs. The MVs of the neighboring blocks 542 can be used to predict the MV 560 of the current block 541. Hence, the MVs of the neighboring blocks 542 can be employed as MVPs 565. The current block 541 can also be temporally adjacent to neighboring blocks 571 in adjacent frames 570. A block is temporally adjacent when the blocks occupy substantially the same spatial position in neighboring frames (e.g., a difference in frame index of one). The temporally adjacent neighboring blocks 571 may also be predicted by MVs that can be used as MVPs 565 for the current block 541.

The AMVP process at the encoder algorithmically generates a list of candidate MVPs 565 based on the MVs for the spatially neighboring blocks 542 and the temporally adjacent blocks 571. The MV 560 for the current block 541 can then be encoded as an index of the candidate list of MVPs 565. The decoder can employ the AMVP process to algorithmically generate the same candidate list of MVPs 565 and then select the correct MVP 565 based on the index. In some examples, the candidate list can be simplified, at both the encoder and the decoder, by performing a redundancy check to remove duplicate MVPs 565 from the candidate list. Also in some examples, the candidate list can be simplified, at both the encoder and the decoder, by removing zero motion MVPs 565 from the candidate list.

In many cases, the selected MVP 565 will be an approximation of the MV 560. Accordingly, the encoder can determine a horizontal motion vector difference component (MVDx) and a vertical motion vector difference component (MVDy) that indicate a spatial difference between the selected MVP 565 and the MV 560. The MV 560 is then encoded as a MVP 565 index, a MVDx, and a MVDy. The decoder can then reconstruct the MV 560 based on the MVP 565 index, a MVDx, and a MVDy encoded in the bitstream.

The RDO process at the encoder considers the information above when performing inter-prediction. For example, the RDO may try each MV 560 for each matching reference block 551 as well as each MVP 565 and corresponding MVDx and MVDy for each MV 560 when selecting prediction information for encoding. The RDO then selects the prediction information based on the tradeoff between video quality and compression.

The RDO process may also consider MVR for the MV 560. In some examples, the MVR can be selected to include a precision of quarter luma sample, one luma sample, or four luma sample. A luma sample is a light value for a pixel. In some cases, encoding an MV 560 at a lower precision can result in significant compression without significant loss in video quality. In other cases, low precision MVs 560 degrade video quality to an unacceptable level and a higher precision is employed. Accordingly, the RDO process can consider the MVR when selecting MV 560 for the current block 541.

As noted above, the MV 560 includes a horizontal component 561 and a vertical component 562. The video quality and compression tradeoff may be different for the horizontal component 561 and the vertical component 562. Accordingly, the RDO process at the encoder can consider the quality loss and compression gain for the horizontal component 561 at various MVRs. The RDO process at the encoder can separately consider the quality loss and compression gain for the vertical component 562 at various MVRs. The RDO can then select a separate horizontal MVR and vertical MVR to balance video quality of the encoding with the encoding size. The horizontal MVR and vertical MVR can be signaled to the decoder as discussed above. The decoder can then employ the horizontal MVR and vertical MVR to round the horizontal and vertical components of the MVP 565, respectively, to a corresponding precision prior to determining the MV 560 based on the MVP 565, the MVDx, and the MVDy.

The horizontal MVR and vertical MVR can be signaled in several ways. The following describes various signaling mechanisms that can be employed to signal the horizontal MVR and vertical MVR to the decoder. In general, an MVR can be signaled by a pair of flags. A first flag can indicate whether the MVR is at quarter luma precision or integer luma precision. A second flag then indicates whether the MVR is at one luma sample precision or four luma sample precision.

In a first set of examples, the horizontal MVR and the vertical MVR are represented by a pair of horizontal MVR flags and a pair of vertical flags, respectively. Such flags can be positioned in various portions of the bitstream, such as in the SPS, the PPS, the slice header, the CU header, and/or in the PU header as shown with respect to the Tables 1-8 listed below.

TABLE 1

| | Descriptor |
|---|---|
| seq_parameter_set_rbsp( ) { | |
| .... | |
| sps_use_vertical_integer_mvr_flag | u(1) |
| sps_use_horizontal_integer_mvr_flag | u(1) |
| if(sps_use_vertical_integer_mvr_flag) | |
| sps_use_vertical_four_mvr_flag | u(1) |
| if(sps_use_horizontal_integer_mvr_flag) | |
| sps_use_horizontal_four_mvr_flag | u(1) |
| ... | |
| } | |

As shown in Table 1, the horizontal MVR and the vertical MVR can be represented by separate horizontal MVR flags and vertical MVR flags in the SPS. The SPS holds information relevant for a sequence of frames. Hence, the syntax of Table 1 could be employed to indicate horizontal MVRs and vertical MVRs that are relevant to a sequence of frames.

The sps_use_vertical_integer_mvr_flag may be set equal to zero to specify that the vertical MVR can be coded in units of quarter luma samples in the sequence and set to one to indicate the vertical MVR can be coded in units of integer luma samples or four luma samples in the sequence. The sps_use_vertical_four_mvr_flag is dependent on the sps_use_vertical_integer_mvr_flag by an if statement. The sps_use_vertical_four_mvr_flag may be set to zero to specify that the vertical MVR can be coded in units of integer luma samples in the sequence (e.g., one luma sample) or set to one to indicate the vertical MVR can be coded in units of four luma samples in the sequence.

The sps_use_horizontal_integer_mvr_flag may be set equal to zero to specify that the horizontal MVR can be coded in units of quarter luma samples in the sequence and set to one to indicate the horizontal MVR can be coded in units of integer luma samples or four luma samples in the sequence. The sps_use_horizontal_four_mvr_flag is dependent on the sps_use_horizontal_integer_mvr_flag by an if statement. The sps_use_horizontal_four_mvr_flag may be set to zero to specify that the horizontal MVR can be coded in units of integer luma samples in the sequence (e.g., one luma sample) or set to one to indicate the horizontal MVR can be coded in units of four luma samples in the sequence.

TABLE 2

| | Descriptor |
|---|---|
| pic_parameter_set_rbsp( ) { | |
| .... | |
| pps_use_vertical_integer_mvr_flag | u(1) |
| pps_use_horizontal_integer_mvr_flag | u(1) |
| if(pps_use_vertical_integer_mv_flag) | |
| pps_use_vertical_four_mvr_flag | u(1) |
| if(pps_use_horizontal_integer_mv_flag) | |
| pps_use_horizontal_four_mvr_flag | u(1) |
| ... | |
| } | |

As shown in Table 2, the horizontal MVR and the vertical MVR can also be represented by separate horizontal MVR flags and vertical MVR flags in the PPS. The PPS holds information relevant to a specific frame. Hence, the syntax of Table 2 could be employed to indicate horizontal MVRs and vertical MVRs that are relevant to a frame.

The pps_use_vertical_integer_mvr_flag may be set equal to zero to specify that the vertical MVR can be coded in units of quarter luma samples in the frame and set to one to indicate the vertical MVR can be coded in units of integer luma samples or four luma samples in the frame. The pps_use_vertical_four_mvr_flag is dependent on the pps_use_vertical_integer_mvr_flag by an if statement. The pps_use_vertical_four_mvr_flag may be set to zero to specify that the vertical MVR can be coded in units of integer luma samples in the frame (e.g., one luma sample) or set to one to indicate the vertical MVR can be coded in units of four luma samples in the frame.

The pps_use_horizontal_integer_mvr_flag may be set equal to zero to specify that the horizontal MVR can be coded in units of quarter luma samples in the frame and set to one to indicate the horizontal MVR can be coded in units of integer luma samples or four luma samples in the frame. The pps_use_horizontal_four_mvr_flag is dependent on the pps_use_horizontal_integer_mvr_flag by an if statement. The pps_use_horizontal_four_mvr_flag may be set to zero to specify that the horizontal MVR can be coded in units of integer luma samples in the frame (e.g., one luma sample) or set to one to indicate the horizontal MVR can be coded in units of four luma samples in the frame.

TABLE 3

| | Descriptor |
|---|---|
| slice_segment_header( ) { | |
| ... | |
| slice_use_vertical_integer_mvr_flag | u(1) |
| slice_use_horizontal_integer_mvr_flag | u(1) |
| if(slice_use_vertical_integer_mvr_flag) | |
| slice_use_vertical_four_mvr_flag | u(1) |
| if(slice_use_horizontal_integer_mvr_flag) | |
| slice_use_horizontal_four_mvr_flag | u(1) |
| ... | |
| } | |

As shown in Table 3, the horizontal MVR and the vertical MVR can also be represented by separate horizontal MVR flags and vertical MVR flags in the slice header. The slice header holds information relevant to a slice (e.g., a horizontal stripe/subset of a frame) of a frame. Hence, the syntax of Table 3 could be employed to indicate horizontal MVRs and vertical MVRs that are relevant to a slice.

The slice_use_vertical_integer_mvr_flag may be set equal to zero to specify that the vertical MVR can be coded in units of quarter luma samples in the slice and set to one to indicate the vertical MVR can be coded in units of integer luma samples or four luma samples in the slice. The slice_use_vertical_four_mvr_flag is dependent on the slice_use_vertical_integer_mvr_flag by an if statement. The slice_use_vertical_four_mvr_flag may be set to zero to specify that the vertical MVR can be coded in units of integer luma samples in the slice (e.g., one luma sample) or set to one to indicate the vertical MVR can be coded in units of four luma samples in the slice.

The slice_use_horizontal_integer_mvr_flag may be set equal to zero to specify that the horizontal MVR can be coded in units of quarter luma samples in the slice and set to one to indicate the horizontal MVR can be coded in units of integer luma samples or four luma samples in the slice. The slice_use_horizontal_four_mvr_flag is dependent on the slice_use_horizontal_integer_mvr_flag by an if statement. The slice_use_horizontal_four_mvr_flag may be set to zero to specify that the horizontal MVR can be coded in units of integer luma samples in the slice (e.g., one luma sample) or set to one to indicate the horizontal MVR can be coded in units of four luma samples in the slice.

TABLE 4

| | Descriptor |
|---|---|
| coding_unit( x0, y0, log2CbSize ) { | |
| ... | |
| cu_use_vertical_integer_mvr_flag | u(1) |
| cu_use_horizontal_integer_mvr_flag | u(1) |
| if(cu_use_vertical_integer_mvr_flag) | |
| cu_use_vertical_four_mvr_flag | u(1) |
| if(cu_use_horizontal_integer_mvr_flag) | |
| cu_use_horizontal_four_mvr_flag | u(1) |
| ... | |
| } | |

As shown in Table 4, the horizontal MVR and the vertical MVR can also be represented by separate horizontal MVR flags and vertical MVR flags in the CU header. The CU header holds information relevant to a CU, which is a partitioned block of a slice, such as a current block. Hence, the syntax of Table 4 could be employed to indicate horizontal MVRs and vertical MVRs that are relevant to a CU.

The cu_use_vertical_integer_mvr_flag may be set equal to zero to specify that the vertical MVR can be coded in units of quarter luma samples in the CU and set to one to indicate the vertical MVR can be coded in units of integer luma samples or four luma samples in the CU. The cu_use_vertical_four_mvr_flag is dependent on the cu_use_vertical_integer_mvr_flag by an if statement. The cu_use_vertical_four_mvr_flag may be set to zero to specify that the vertical MVR can be coded in units of integer luma samples in the CU (e.g., one luma sample) or set to one to indicate the vertical MVR can be coded in units of four luma samples in the CU.

The cu_use_horizontal_integer_mvr_flag may be set equal to zero to specify that the horizontal MVR can be coded in units of quarter luma samples in the CU and set to one to indicate the horizontal MVR can be coded in units of integer luma samples or four luma samples in the CU. The cu_use_horizontal_four_mvr_flag is dependent on the cu_use_horizontal_integer_mvr_flag by an if statement. The cu_use_horizontal_four_mvr_flag may be set to zero to specify that the horizontal MVR can be coded in units of integer luma samples in the CU (e.g., one luma sample) or set to one to indicate the horizontal MVR can be coded in units of four luma samples in the CU.

TABLE 5

| | Descriptor |
|---|---|
| prediction_unit( x0, y0, nPbW, nPbH ) { | |
| ... | |
| pu_use_vertical_integer_mvr_flag | u(1) |
| pu_use_horizontal_integer_mvr_flag | u(1) |
| if(pu_use_vertical_integer_mvr_flag) | |
| pu_use_vertical_four_mvr_flag | u(1) |
| if(pu_use_horizontal_integer_mvr_flag) | |
| pu_use_horizontal_four_mvr_flag | u(1) |
| ... | |
| } | |

As shown in Table 5, the horizontal MVR and the vertical MVR can also be represented by separate horizontal MVR flags and vertical MVR flags in the PU header. The PU header holds information relevant to a PU, which is encoded prediction data that can be employed to reconstruct a current block. Hence, the syntax of Table 5 could be employed to indicate horizontal MVRs and vertical MVRs that are relevant to a PU.

The pu_use_vertical_integer_mvr_flag may be set equal to zero to specify that the vertical MVR can be coded in units of quarter luma samples in the Pu and set to one to indicate the vertical MVR can be coded in units of integer luma samples or four luma samples in the PU. The pu_use_vertical_four_mvr_flag is dependent on the pu_use_vertical_integer_mvr_flag by an if statement. The pu_use_vertical_four_mvr_flag may be set to zero to specify that the vertical MVR can be coded in units of integer luma samples in the PU (e.g., one luma sample) or set to one to indicate the vertical MVR can be coded in units of four luma samples in the PU.

The pu_use_horizontal_integer_mvr_flag may be set equal to zero to specify that the horizontal MVR can be coded in units of quarter luma samples in the PU and set to one to indicate the horizontal MVR can be coded in units of integer luma samples or four luma samples in the PU. The pu_use_horizontal_four_mvr_flag is dependent on the pu_use_horizontal_integer_mvr_flag by an if statement. The pu_use_horizontal_four_mvr_flag may be set to zero to specify that the horizontal MVR can be coded in units of integer luma samples in the PU (e.g., one luma sample) or set to one to indicate the horizontal MVR can be coded in units of four luma samples in the PU.

TABLE 6

| | Descriptor |
|---|---|
| slice_segment_header( ) { | |
| ... | |
| if(sps_use_vertical_integer_mvr_flag){ | |
| slice_use_vertical_integer_mvr_flag | u(1) |
| slice_use_horizontal_integer_mvr_flag | u(1) |
| } | |
| if(sps_use_horizontal_integer_mvr_flag){ | |
| if(slice_use_vertical_integer_mvr_flag) | |
| slice_use_vertical_four_mvr_flag | u(1) |
| if(slice_use_horizontal_integer_mvr_flag) | |
| slice_use_horizontal_four_mvr_flag | u(1) |
| } | |
| ... | |
| } | |

As shown in Table 6, the horizontal MVR and the vertical MVR can also be represented by separate horizontal MVR flags and vertical MVR flags in the slice header that depend on flags in the SPS. The syntax in Table 6 is the same as syntax in Table 1 and Table 3. In this case, the horizontal MVR and the vertical MVR for a slice can be set to inherit values from the SPS or set to have distinct values for the corresponding slice.

TABLE 7

| | Descriptor |
|---|---|
| slice_segment_header( ) { | |
| ... | |
| if(pps_use_vertical_integer_mvr_flag){ | |
| slice_use_vertical_integer_mvr_flag | u(1) |
| slice_use_horizontal_integer_mvr_flag | u(1) |
| } | |
| if(pps_use_horizontal_integer_mvr_flag){ | |
| if(slice_use_vertical_integer_mvr_flag) | |
| slice_use_vertical_four_mvr_flag | u(1) |
| if(slice_use_horizontal_integer_mvr_flag) | |
| slice_use_horizontal_four_mvr_flag | u(1) |
| } | |
| ... | |
| } | |

As shown in Table 7, the horizontal MVR and the vertical MVR can also be represented by separate horizontal MVR flags and vertical MVR flags in the slice header that depend on flags in the PPS. The syntax in Table 7 is the same as syntax in Table 2 and Table 3. In this case, the horizontal MVR and the vertical MVR for a slice can be set to inherit values from the PPS or set to have distinct values for the corresponding slice.

TABLE 8

| | Descriptor |
|---|---|
| coding_unit( x0, y0, log2CbSize ) { | |
| ... | |
| if(slice_use_vertical_integer_mvr_flag){ | |
| cu_use_vertical_integer_mvr_flag | u(1) |
| cu_use_horizontal_integer_mvr_flag | u(1) |
| } | |
| if(slice_use_horizontal_integer_mvr_flag){ | |
| if(cu_use_vertical_integer_mvr_flag) | |
| cu_use_vertical_four_mvr_flag | u(1) |
| if(cu_use_horizontal_integer_mvr_flag) | |
| cu_use_horizontal_four_mvr_flag | u(1) |
| } | |
| ... | |
| } | |

As shown in Table 8, the horizontal MVR and the vertical MVR can also be represented by separate horizontal MVR flags and vertical MVR flags in the CU header that depend on flags in the slice header. The syntax in Table 8 is the same as syntax in Table 3 and Table 4. In this case, the horizontal MVR and the vertical MVR for a CU can be set to inherit values from the slice or set to have distinct values for the corresponding CU.

In a second set of examples, one of the horizontal MVR and the vertical MVR is signaled in the bitstream, but not both. The signaled MVR is signaled as a directional set of MVR flags (either horizontal or vertical) in a manner similar to the examples shown in Tables 1-8. The un-signaled MVR is then derived from the directional set of MVR flags and additional information. The additional information may be explicitly signaled or already known to both the encoder and the decoder by inference.

TABLE 9

| | Descriptor |
|---|---|
| seq_parameter_set_rbsp( ) { | |
| .... | |
| sps_use_vertical_integer_mvr_flag | u(1) |
| if(sps_use_vertical_integer_mvr_flag) | |
| sps_use_vertical_four_mvr_flag | u(1) |
| sps_mvr_horizontal_vertical_ratio | ae(v) |
| ... | |
| } | |

As shown in Table 9, the vertical MVR can be represented as a directional set of MVR flags. Further, the horizontal MVR could instead be signaled as a directional set of MVR flags in some examples. A horizontal to vertical MVR ratio, denoted as sps_mvr_horizontal_vertical_ratio, is also employed. The horizontal to vertical MVR ratio indicates a ratio between the horizontal MVR and the vertical MVR. Accordingly, the decoder can employ the signaled MVR and the signaled horizontal to vertical MVR ratio to derive the un-signaled MVR. Table 9 shows the directional set of MVR flags and the horizontal to vertical MVR ratio signaled in the SPS. However, the directional set of MVR flags and the horizontal to vertical MVR ratio may instead be signaled in the PPS, slice header, CU header, and/or PU header by employing syntax in a manner similar to Tables 1-8.

In another example, the horizontal to vertical MVR ratio can be signaled at a different level (e.g., SPS, PPS, etc.) from the directional set of MVR flags (e.g., slice header, CU, PU, etc.). In such a case, the horizontal to vertical MVR ratio can be signaled for a larger group of blocks, such as for a sequence, a picture, a slice, etc. and then the un-signaled MVR can be derived from the signaled MVR at smaller level, such as for a specific slice, a specific CU, a specific PU, etc.

TABLE 10

| | Descriptor |
|---|---|
| coding_unit( x0, y0, log2CbSize ) { | |
| ... | |
| cu_use_vertical_integer_mvr_flag | u(1) |
| if(cu_use_vertical_integer_mvr_flag) | |
| cu_use_vertical_four_mvr_flag | u(1) |
| ... | |
| } | |

Table 10 shown an example where a set of vertical MVR flags are signaled in the CU header. The horizontal MVR flags can then be generated from the vertical MVR flags by employing the horizontal to vertical MVR ratio as signaled at a higher level, such as in the SPS level as in Table 9. The horizontal MVR, denoted as MVRx, can be determined according to equation 1:

$$MVRy = MVRx / mvr\_horizontal\_vertical\_ratio \quad \text{Equation 1}$$

where MVRy is the vertical MVR as signaled. Table 11 shows a similar example where vertical MVR is derived from horizontal MVR.

TABLE 11

| | Descriptor |
|---|---|
| coding_unit( x0, y0, log2CbSize ) { | |
| ... | |
| cu_use_horizontal_integer_mvr_flag | u(1) |
| if(cu_use_vertical_integer_mvr_flag) | |
| cu_use_horizontal_four_mvr_flag | u(1) |
| ... | |
| } | |

As shown in Table 11, horizontal MVR can be signaled, in this case at the CU level, and a horizontal to vertical MVR ratio, which may be signaled at a separate level, can be employed to derive the vertical MVR. For example, the vertical MVR, denoted as MVRy, can be determined according to equation 2:

$$MVRy = MVRx * mvr\_horizontal\_vertical\_ratio \quad \text{Equation 2}$$

where MVRx is the signaled horizontal MVR and mvr_horizontal_vertical_ratio is the horizontal to vertical MVR ratio.

As another example, the directional set of MVR flags can be signaled at the SPS, PPS, slice, CU, and/or PU level. The un-signaled MVR can then be determined by the decoder according to other information known to the decoder or signaled for other purposes. For example, the decoder can derive the un-signaled MVR from the signaled directional set of MVR flags based on the picture resolution. Specifically, the picture resolution may be a ratio of picture width to picture height and may already be known to the decoder. For example, the vertical MVR, denoted as MVRy, or the horizontal MVR, denoted as MVRx, can be determined according to equation 3 or equation 4 based on the picture resolution and the signaled direction set of MVR flags:

$$MVRx = MVRy * (pic\_width\_in\_luma\_samples / pic\_height\_in\_luma\_samples) \quad \text{Equation 3}$$

$$MVRx = MVRy / (pic\_height\_in\_luma\_samples / pic\_width\_in\_luma\_samples) \quad \text{Equation 4}$$

where pic_height_in_luma_samples is the height of the picture in luma samples (e.g., pixels) and pic_width_in_luma_samples is the width of the picture in luma samples (e.g., pixels), respectively.

In yet another sample, the matching process employs a vertical search range, denoted as searchrange_height, and a horizontal search range, denoted as searchrange_width, when matching a current block to a reference block. The signaled directional set of MVR flags can be employed in conjunction with the horizontal search range and vertical search range to derive the un-signaled MVR according to equation 5 or equation 6 below.

$$MVRx = MVRy * (searchrange\_width / searchrang\_height) \quad \text{Equation 5}$$

$$MVRx = MVRy / (searchrange\_height / searchrange\_width) \quad \text{Equation 6}$$

In some examples, when the values employed in the ratio (e.g., height of the picture, width of the picture, search range height, or search range width) are not integer values, such values can be rounded to the nearest integer. In another example, such values can be rounded to the nearest integer which is power of two or other integer values.

Figure 6:
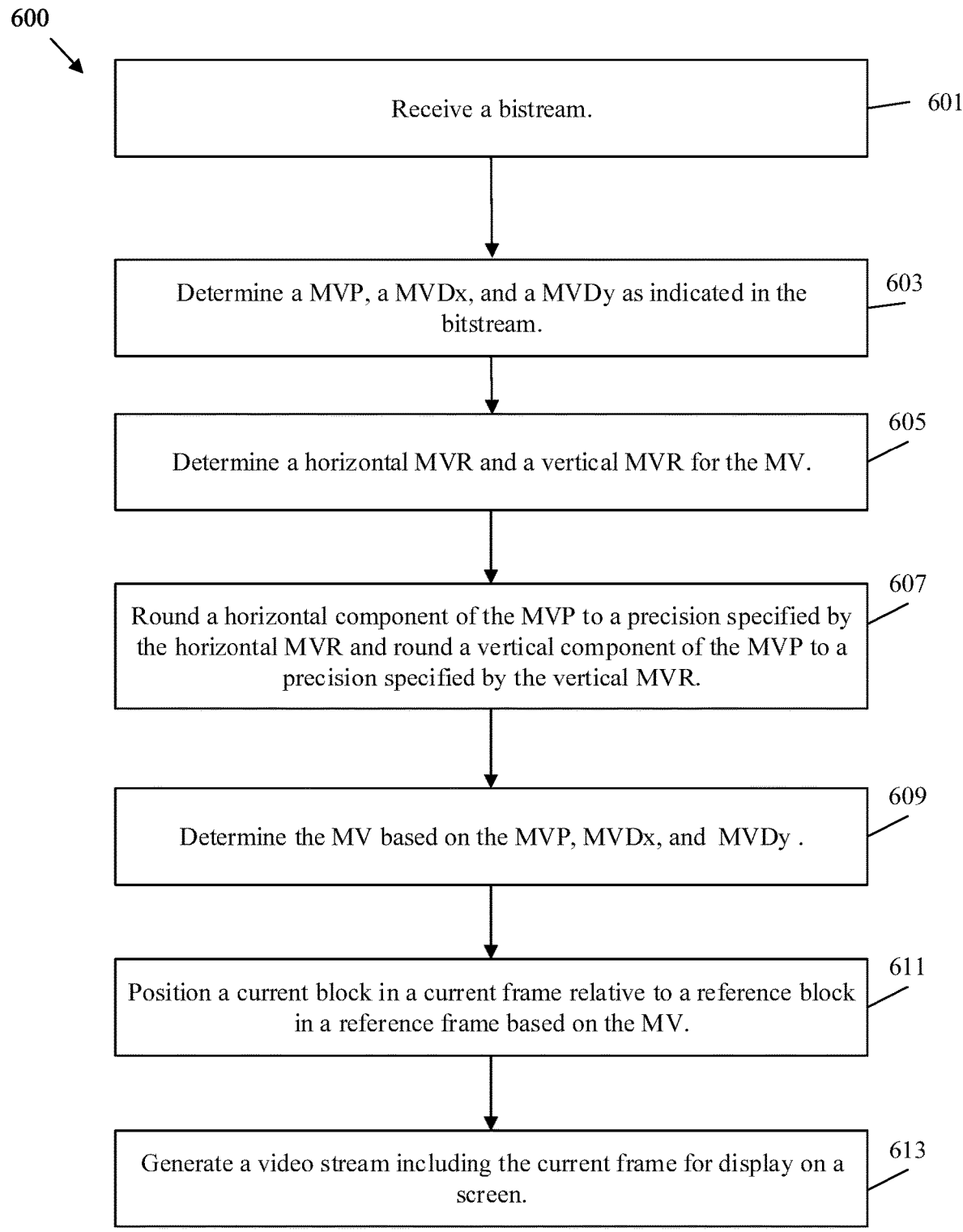
FIG. 6 is a flowchart of an example method of decoding a video stream with a horizontal motion vector resolution (MVR) and a vertical MVR.

FIG. 6 is a flowchart of an example method 600 of decoding a video stream with a horizontal MVR and a vertical MVR. Specifically, method 600 may employ motion prediction 500 at a decoder, such as decoder 400, when performing inter-prediction. Accordingly, method 600 can be employed as part of step 113 of method 100, in motion estimation component 221 and motion compensation component 219 of codec system 200, and/or in motion compensation component 421 of decoder 400.

At step 601 a bitstream is received. Depending on the example, the bitstream may include horizontal MVR flags indicating the horizontal MVR and vertical MVR flags indicating the vertical MVR. In other examples, the bitstream includes a directional set of flags indicating the vertical MVR and a horizontal to vertical MVR ratio indicating a ratio between the horizontal MVR and the vertical MVR. In yet other examples, the bitstream includes a directional set of flags indicating the horizontal MVR and a horizontal to vertical MVR ratio indicating a ratio between the horizontal MVR and the vertical MVR. The horizontal MVR flags, the vertical MVR flags, and/or a corresponding ratio can be signaled in the bitstream in a SPS, in a PPS, in a slice header, in a CU, in a PU, and/or in combinations thereof. In some examples, the horizontal MVR flags, the vertical MVR flags, and/or a corresponding ratio can be signaled in a slice header that depends from SPS or PPS flags. In yet other examples, the horizontal MVR flags, the vertical MVR flags, and/or a corresponding ratio can be signaled in CU flags that depend from slice header flags.

At step 603, a MVP, an MVDx, and an MVDy, associated with an MV are determined as indicated by the bitstream. For example, the decoder may generate a MVP candidate list based on MVs in blocks that are spatially and/or temporally adjacent to the current block. The decoder can then obtain a MVP index from the bitstream that indicates the selected MVP from the candidate list. The decoder can also obtain the MVDx and MVDy directly from the bitstream.

Further, the horizontal MVR and vertical MVR for the MV are determined at step 605. Depending on the example, the horizontal MVR and vertical MVR can be determined based on horizontal MVR flags and vertical MVR flags in the bitstream. For example, the horizontal MVR flags may include a horizontal integer MVR flag indicating whether the horizontal MVR is a quarter luma sample precision, and a horizontal four MVR flag indicating whether the horizontal MVR is an integer luma sample precision or a four luma sample precision. Further, the vertical MVR flags can include a vertical integer MVR flag indicating whether the vertical MVR is a quarter luma sample precision, and a vertical four MVR flag indicating whether the vertical MVR is an integer luma sample precision or a four luma sample precision. In other examples, the signaled directional flags may indicate the horizontal MVR, and the vertical MVR can be derived based on the horizontal MVR and a signaled horizontal to vertical MVR ratio. In other examples, the signaled directional flags may indicate the vertical MVR, and the horizontal MVR can be derived based on the vertical MVR and a signaled horizontal to vertical MVR ratio. In other examples, the signaled directional flags may indicate the horizontal MVR, and the vertical MVR can be derived based on the horizontal MVR and a ratio of a picture width in luma samples and a picture height in luma samples. In other examples, the signaled directional flags may indicate the vertical MVR, and the horizontal MVR can be derived based on the vertical MVR and a ratio of a picture width in luma samples and a picture height in luma samples. In other examples, the signaled directional flags may indicate the horizontal MVR, and the vertical MVR can be derived based on the horizontal MVR and a ratio of a motion search range width and a motion search range height. In other examples, the signaled directional flags may indicate the vertical MVR, and the horizontal MVR can be derived based on the vertical MVR and a ratio of a motion search range width and a motion search range height.

Regardless of the mechanism employed to determine the horizontal MVR and the vertical MVR, step 607 separately applies the horizontal MVR and the vertical MVR. Specifically, step 607 rounds a horizontal component of the MVP to a precision specified by the horizontal MVR. The vertical component of the MVP is also rounded to a precision specified by the vertical MVR.

At step 609, the MV is determined according to the MVP as rounded by the horizontal MVR and the vertical MVR along with the MVDx and MVDy. Specifically, the MVDx is added to the horizontal component of the MVP and the MVDy is added to the vertical component of the MVP. This results in a reconstructed MV.

At step 611, the reconstructed MV is employed to position a current block in a current frame relative to a reference block in a reference frame as discussed with respect to FIG. 5 above. A video stream can then be generated at step 613 that includes the current frame and the current block as positioned based on the MV with the resolution set by the horizontal MVR and the vertical MVR through rounding the MVP. Further, the video stream can be forwarded to a screen for display to a user.

Figure 7:
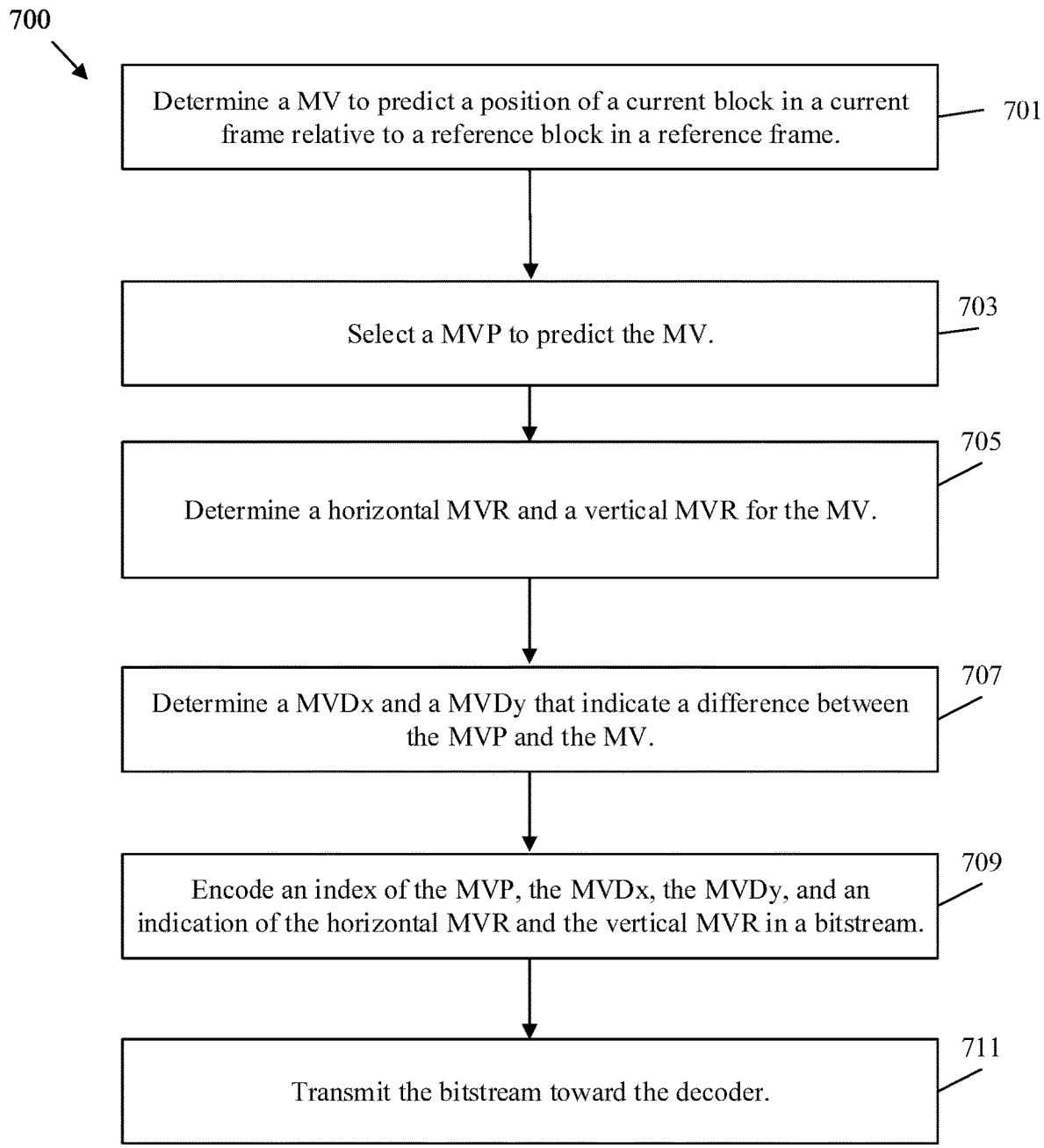
FIG. 7 is a flowchart of an example method of encoding a video stream with a horizontal MVR and a vertical MVR.

FIG. 7 is a flowchart of an example method 700 of encoding a video stream with a horizontal MVR and a vertical MVR. Specifically, method 700 may employ motion prediction 500 at an encoder, such as encoder 300 when performing inter-prediction. Accordingly, method 700 illustrates a process employed in step 105 of method 100, in motion estimation component 221 and motion compensation component 219 of codec system 200, and/or in motion compensation component 321 of encoder 300.

At step 701, an MV is determined according to a RDO process. The MV is determined to predict a position of a current block in a current frame relative to a reference block in a reference frame. At step 703, the RDO process continues and is employed to select a MVP to predict the MV. For example, the encoder may generate a MVP candidate list based on MVs in blocks that are spatially and/or temporally adjacent to the current block. The encoder can then select an MVP from the MVP candidate list and encode an index for the selected MVP in the bitstream.

At step 705, the RDO process continues and is employed to determine a horizontal MVR and a vertical MVR for the MV. The horizontal MVR and the vertical MVR are selected to balance image quality and coding efficiency (e.g., image degradation versus encoding size) in both the horizontal and the vertical spatial domain. The horizontal component of the MVP can then be rounded to a precision associated with the horizontal MVR and the vertical component of the MVP can be rounded to a precision associated with the vertical MVR. The horizontal MVR and the vertical MVR can be different values. Further, the horizontal MVR and the vertical MVR can indicate a precision of quarter luma sample, single luma sample, or four luma sample precision.

At step 707, a MVDx and a MVDy are determined to indicate a difference between the MVP, as rounded by the horizontal MVR and the vertical MVR, and the MV determined at step 701.

At step 709, an index of the MVP in the MVP candidate list can be encoded in a bitstream along with the MVDx, the MVDy, and an indication of the horizontal MVR and the vertical MVR. Such information is encoded in the bitstream to support determination of the MV at a decoder according to method 600. The indication of the horizontal MVR and the vertical MVR can include horizontal MVR flags indicating the horizontal MVR and vertical MVR flags indicating the vertical MVR in some examples. Such flags can be encoded in the SPS, the PPS, the slice header, the CU header, the PU header, and/or in combinations thereof. In some examples, the horizontal MVR flags, the vertical MVR flags, and/or a corresponding ratio can be signaled in a slice header that depends from SPS or PPS flags. In yet other examples, the horizontal MVR flags, the vertical MVR flags, and/or a corresponding ratio can be signaled in CU flags that depend from slice header flags. In other examples, the indication of the horizontal MVR and the vertical MVR can include a directional set of flags indicating the vertical MVR and a horizontal to vertical MVR ratio indicating a ratio between the horizontal MVR and the vertical MVR. In yet other examples, the indication of the horizontal MVR and the vertical MVR can include a directional set of flags indicating the horizontal MVR and a horizontal to vertical MVR ratio indicating a ratio between the horizontal MVR and the vertical MVR. In yet other examples, the indication of the horizontal MVR and the vertical MVR can include a directional set of flags indicating the horizontal MVR or the vertical MVR. The decoder can then determine the un-signaled MVR based on a ratio of a picture width in luma samples and a picture height in luma samples or on a ratio of a motion search range width and a motion search range height.

At step 711, the bitstream with the index of the MVP, the MVDx, the MVDy, and the indication of the horizontal MVR and the vertical MVR can be signaled toward the decoder. Accordingly, the decoder can decode the encoded current block and current frame based on the encoded information, for example according to method 600.

Figure 8:
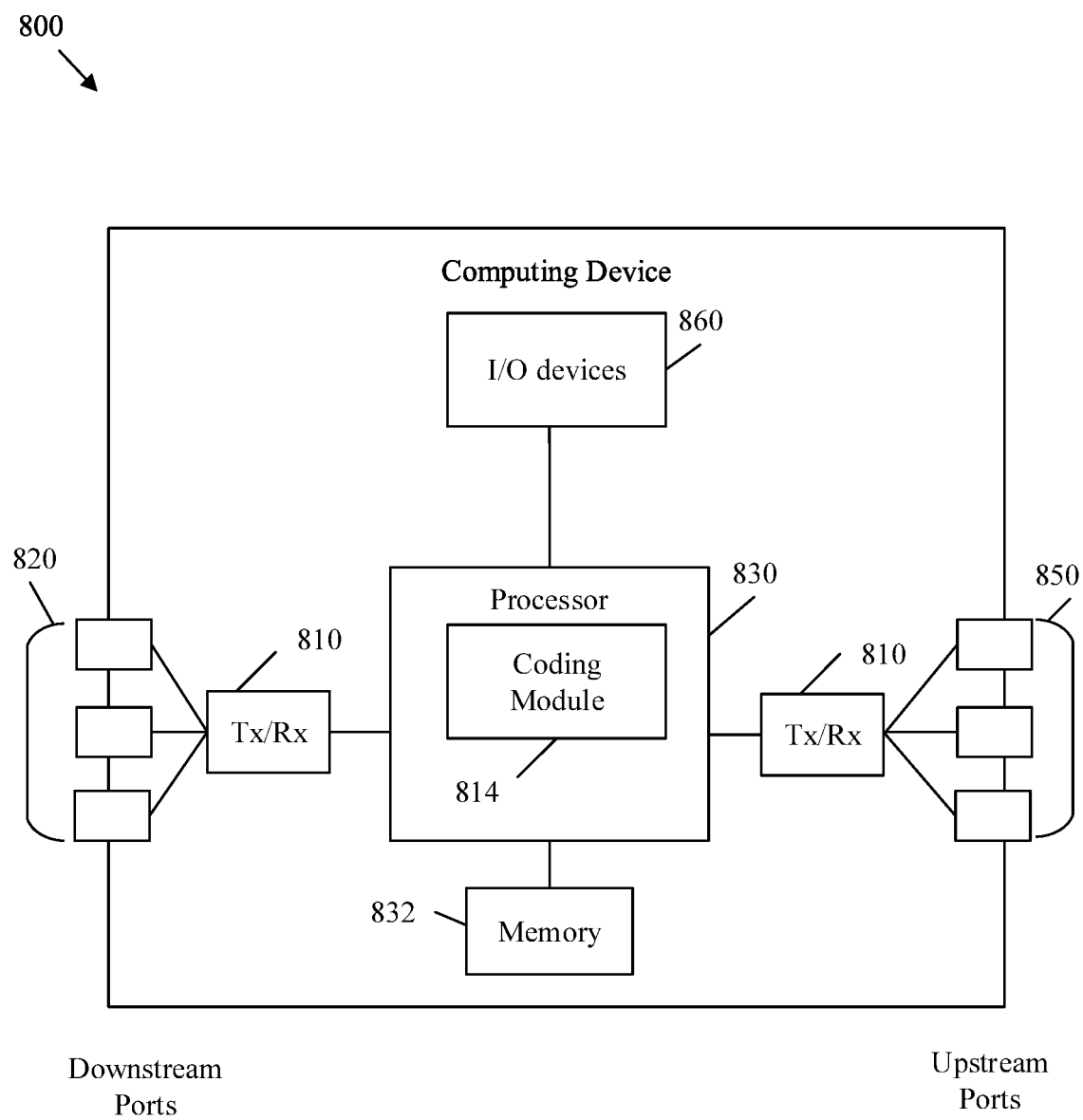
FIG. 8 is a schematic diagram of a computing device for video coding.

FIG. 8 is a schematic diagram of a computing device 800 for video coding according to an embodiment of the disclosure. The computing device 800 is suitable for implementing the disclosed embodiments/examples as described herein. The computing device 800 comprises downstream ports 820, upstream ports 850, and/or transceiver units (Tx/Rx) 810 for communicating data upstream and/or downstream over a network. The computing device 800 also includes a processor 830 including a logic unit and/or central processing unit (CPU) to process the data and a memory 832 for storing the data. The computing device 800 may also comprise optical-to-electrical (OE) components, electrical-to-optical (EO) components, and/or wireless communication components coupled to the upstream ports 850 and/or downstream ports 820 for communication of data via optical or wireless communication networks. The computing device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx units 810, upstream ports 850, and memory 832. The processor 830 comprises a coding module 814. The coding module 814 implements the disclosed embodiments described above, such as methods 100, 600, and/or 700. The coding module 814 may also implement motion prediction 500, as well as implement a codec system 200, an encoder 300, and/or a decoder 400, depending on the example. Accordingly, coding module 814 may employ any mechanism discussed above for determining a horizontal MVR and vertical MVR and/or coding a horizontal MVR and/or a vertical MVR in a bitstream at an encoder. Further, coding module 814 may employ any mechanism discussed above for determining/deriving a horizontal MVR and vertical MVR from the bitstream at the decoder and employing such information to determine an MV to reconstruct a video frame. The inclusion of the coding module 814 therefore provides a substantial improvement to the functionality of the computing device 800 and effects a transformation of the computing device 800 to a different state. Alternatively, the encoding/decoding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

The disclosure includes an apparatus comprising a receiving means to receive a bitstream; and a processing means to determine a motion vector predictor (MVP), a horizontal motion vector difference component (MVDx), and a vertical motion vector difference component (MVDy) associated with a motion vector (MV) based on data coded in the bitstream; determine a horizontal MV resolution (MVR) and a vertical MVR for the MV; round a horizontal component of the MVP to a precision specified by the horizontal MVR and round a vertical component of the MVP to a precision specified by the vertical MVR; determine the MV based on the MVP, the MVDx, and the MVDy; employ the MV to position a current block in a current frame relative to a reference block in a reference frame; and generate a video stream including the current frame for display on a display means.

The disclosure also includes an apparatus comprising a processing means to determine a motion vector (MV) to predict a position of a current block in a current frame relative to a reference block in a reference frame; select a motion vector predictor (MVP) to predict the MV; determine a horizontal motion vector difference component (MVDx) and a vertical motion vector difference component (MVDy) that indicate a difference between the MVP and the MV; determine a horizontal MV resolution (MVR) and a vertical MVR for the MV; and encode an index of the MVP, the MVDx, the MVDy, and an indication of the horizontal MVR and the vertical MVR in a bitstream to support determination of the MV at a decoder; and a transmitting means to the bitstream toward the decoder.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method, implemented in a computing device, the method comprising:
receiving, by a receiver coupled to a processor in a computing device, a bitstream comprising a horizontal motion vector (MV) resolution (MVR) and a separately signaled vertical MVR for a MV, wherein the horizontal MVR and the vertical MVR are separately signaled according to flags indicating the horizontal MVR and a horizontal to vertical MVR ratio indicating a ratio between the horizontal MVR and the vertical MVR;
determining, by the processor, a motion vector predictor (MVP), a horizontal motion vector difference component (MVDx), and a vertical motion vector difference component (MVDy) associated with the MV;
obtaining, by the processor, the horizontal MVR and the vertical MVR for the MV from the bitstream;
rounding, by the processor, a horizontal component of the MVP to a horizontal precision specified by the horizontal MVR and rounding a vertical component of the MVP to a vertical precision specified by the vertical MVR, wherein the vertical precision of the MVP is smaller than the horizontal precision of the MVP;
determining the MV based on the MVP, the MVDx, and the MVDy;
employing, by the processor, the MV to position a current block in a current frame relative to a reference block in a reference frame; and
generating, by the processor, a video stream including the current frame for display on a screen.

2. The method of claim 1, wherein the flags are signaled in the bitstream in a sequence parameter set (SPS), in a picture parameter set (PPS), in a slice header, in a coding unit (CU), or in a prediction unit (PU).

3. The method of claim 1, wherein the flags are signaled in the bitstream in slice header flags that depend from sequence parameter set (SPS) flags or picture parameter set (PPS) flags.

4. The method of claim 1, wherein the flags are signaled in the bitstream in coding unit (CU) flags that depend from slice header flags.

5. A method, implemented in a computing device, the method comprising:
determining, by a processor in the computing device, a motion vector (MV) to predict a position of a current block in a current frame relative to a reference block in a reference frame;
selecting, by the processor, a motion vector predictor (MVP) to predict the MV;
determining, by the processor, a horizontal motion vector difference component (MVDx) and a vertical motion vector difference component (MVDy) that indicate a difference between the MVP and the MV;
determining, by the processor, a horizontal MV resolution (MVR) and a vertical MVR for the MV, wherein the vertical MVR indicates a vertical precision of the MVP that is smaller than a horizontal precision of the MVP indicated by the horizontal MVR;
encoding an index of the MVP, the MVDx, the MVDy, and an indication of the horizontal MVR for the MV and a separately signaled indication of the vertical MVR for the MV in a bitstream to support determination of the MV at a decoder, wherein the indication of the horizontal MVR and the indication of the vertical MVR are separately signaled according to flags indicating the horizontal MVR and a horizontal to vertical MVR ratio indicating a ratio between the horizontal MVR and the vertical MVR; and
transmitting, via a transmitter coupled to the processor, the bitstream toward the decoder.

6. A computing device comprising:
a receiver to receive a bitstream comprising a horizontal motion vector (MV) resolution (MVR) and a separately signaled vertical MVR for a MV, wherein the horizontal MVR and the vertical MVR are separately signaled according to flags indicating the horizontal MVR and a horizontal to vertical MVR ratio indicating a ratio between the horizontal MVR and the vertical MVR; and
a processor coupled to the receiver, the processor configured to:
determine a motion vector predictor (MVP), a horizontal motion vector difference component (MVDx), and a vertical motion vector difference component (MVDy) based on data coded in the bitstream;
determine a MV based on the MVP, the MVDx, and the MVDy;
determine the horizontal MVR and the vertical MVR for the MV;
round a horizontal component of the MV to a horizontal precision specified by the horizontal MVR and round a vertical component of the MV to a vertical precision specified by the vertical MVR, wherein the vertical precision of the MVP is smaller than the horizontal precision of the MVP;
position a current block in a current frame relative to a reference block in a reference frame based on the MV; and
generate a video stream including the current frame for display on a screen.

7. The computing device of claim 6, wherein the flags are signaled in the bitstream in a sequence parameter set (SPS), in a picture parameter set (PPS), or in a slice header.

8. The computing device of claim 6, wherein the flags are signaled in the bitstream in slice header flags that depend from sequence parameter set (SPS) flags or picture parameter set (PPS) flags.

9. The computing device of claim 6, wherein the flags are signaled in the bitstream in coding unit (CU) flags that depend from slice header flags.

10. The method of claim 5, wherein the flags are signaled in the bitstream in a sequence parameter set (SPS), in a picture parameter set (PPS), or in a slice header.

11. The method of claim 5, wherein the flags are signaled in the bitstream in slice header flags that depend from sequence parameter set (SPS) flags or picture parameter set (PPS) flags.

12. The method of claim 5, wherein the flags are signaled in the bitstream in coding unit (CU) flags that depend from slice header flags.

* * * * *

UNITED STATES PATENT AND TRADEMARK OFFICE
CERTIFICATE OF CORRECTION

PATENT NO. : 10,841,794 B2
APPLICATION NO. : 16/018550
DATED : November 17, 2020
INVENTOR(S) : Shan Liu et al.

Page 1 of 1

It is certified that error appears in the above-identified patent and that said Letters Patent is hereby corrected as shown below:

On the Title Page

Page 2
Second Column, Other Publications, Lines 71-72, should read:
Cao, X., et al., "AHG16 Unification of SDIP and NSQT," JCTVC-H0347, Feb. 1-10, 2012, 9 pages.

Page 3
Column 1, References Cited, Other Publications, Lines 19-20, should read:
Xu, X., et al., "CE2 Test 3.2: Intra BC merge mode with default candidates," JCTVC-T0073, Feb. 10-18, 2015, 6 pages.

Signed and Sealed this
Twenty-second Day of December, 2020

Andrei Iancu
*Director of the United States Patent and Trademark Office*